United States Patent [19]

Smith

[11] 4,314,094
[45] Feb. 2, 1982

[54] CABLE SEAL SPLICE ENCLOSURE

[75] Inventor: Bert A. Smith, Northridge, Calif.

[73] Assignee: Preformed Line Products Co., Cleveland, Ohio

[21] Appl. No.: 106,455

[22] Filed: Dec. 26, 1979

[51] Int. Cl.³ .......................................... H02G 15/08
[52] U.S. Cl. ...................................... 174/78; 174/87; 174/76
[58] Field of Search ................ 174/78, 76, 87, 91, 174/93, 138 F

[56] References Cited

U.S. PATENT DOCUMENTS

| | | | |
|---|---|---|---|
| 3,619,481 | 11/1971 | Smith | 174/76 X |
| 3,646,250 | 2/1972 | Estes | 174/138 F |
| 3,806,630 | 4/1974 | Thompson et al. | 174/87 X |
| 3,836,694 | 9/1974 | Kapell | 174/93 X |
| 3,919,460 | 11/1975 | Neail et al. | 174/87 |
| 3,934,076 | 1/1976 | Smith | 174/87 |
| 4,039,742 | 8/1977 | Smith | 174/76 X |
| 4,053,704 | 10/1977 | Smith | 174/76 X |

*Primary Examiner*—B. A. Reynolds
*Assistant Examiner*—D. A. Tone
*Attorney, Agent, or Firm*—Lyon & Lyon

[57] ABSTRACT

A container for protecting cable splices from the environment. The container includes a vial having corrugated walls forming internal threads. The vial is filled with a sealant into which the splice is to be immersed. The container further includes a plug having passageways for accepting incoming cable. The plug is designed to be fixed with a sleeve having external threads of corrugated construction which thread into the vial. A resilient cap is provided to cover the entire opened end of the vial; inserts are provided for accepting cable of various sizes and a bracket can be fixed to the inside of the plug to operate as a ground shield connector and for structural support.

6 Claims, 6 Drawing Figures

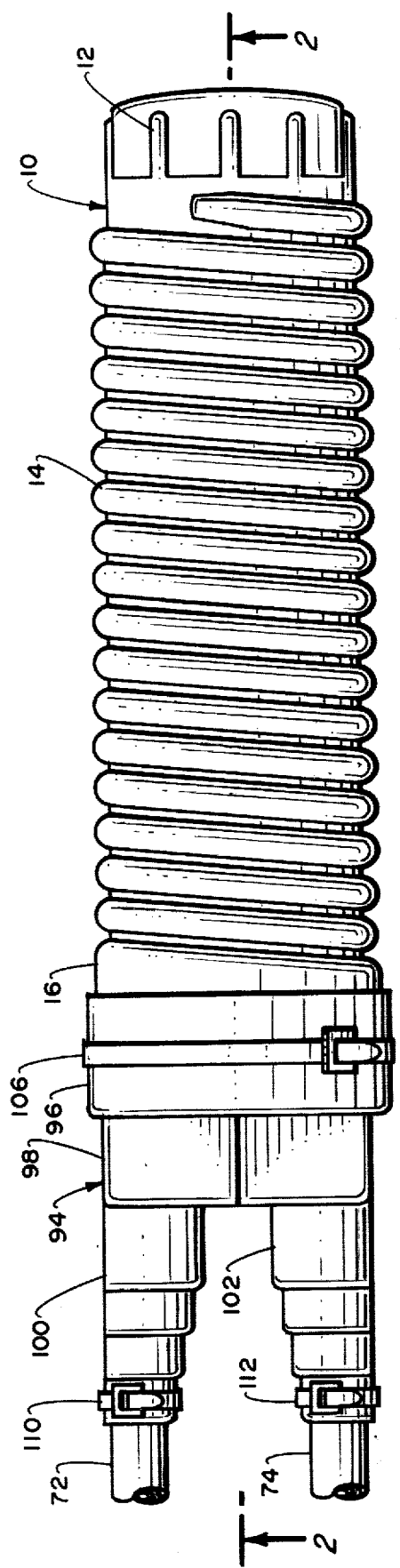
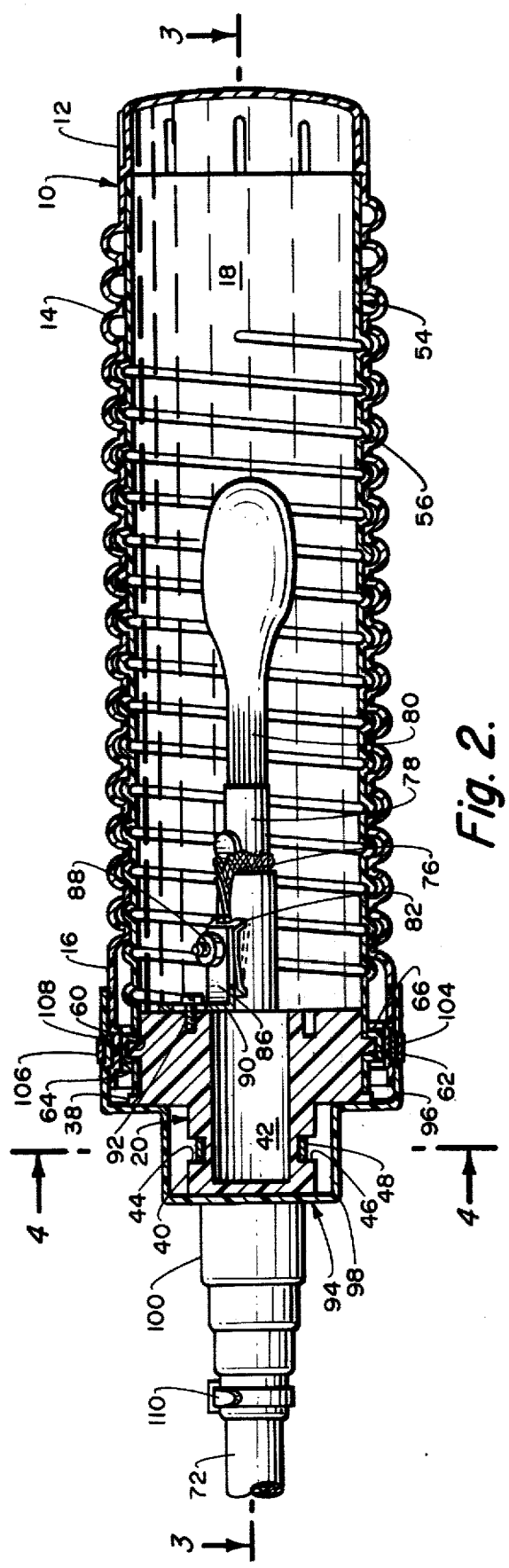

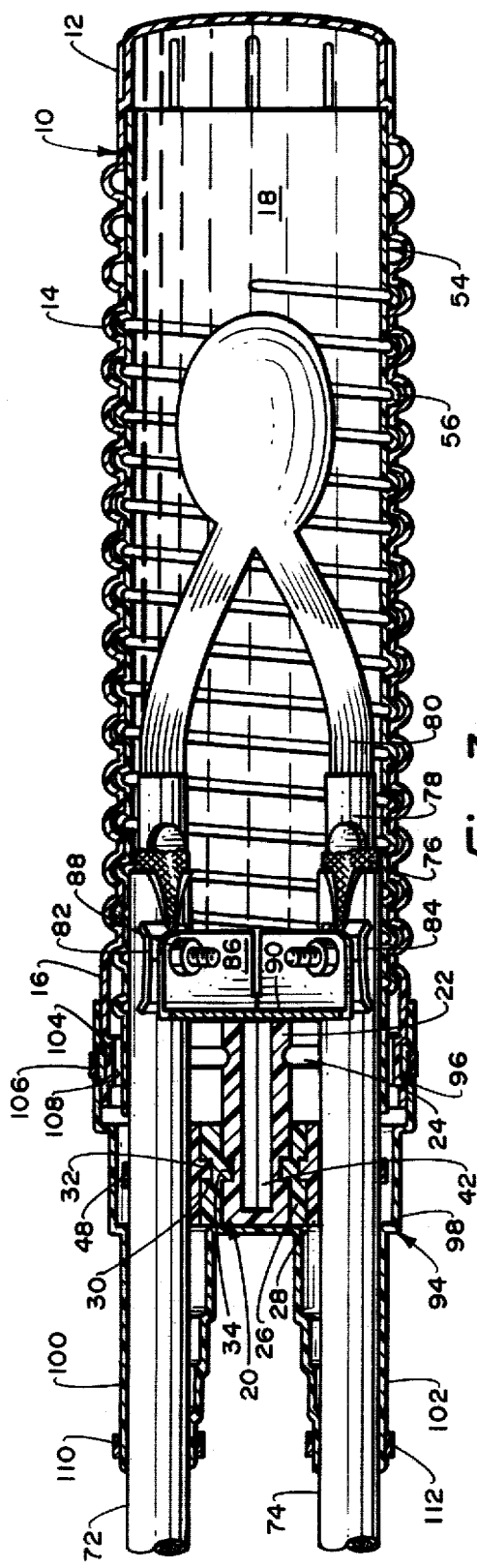

CABLE SEAL SPLICE ENCLOSURE

BACKGROUND OF THE INVENTION

The present invention is directed to cable splice enclosures and particularly enclosures of the type employing immersion of the splice in a body of sealant.

Utility and communication lines have traditionally been constructed above ground. However, governmental requirements and customer preference have resulted in more and more below ground installations. It has been found that the below ground installations are subject to a far harsher environment requiring a more sophisticated protection system for the encased conductors. The problems associated with underground systems become particularly acute where a break in the conductor is required. As a result, the utility and communications industry has endeavored to develop closures for these necessary splices which are able to provide reliable, long-term protection of the encased conductors. A number of systems have been found to be relatively successful in preventing moisture intrusion and corrosion and in providing structural strength needed to protect underground splices. However, many of these devices have been found to be difficult to assemble or unsuited for a wide range of applications.

To further elaborate on a major problem which has existed in the fabrication of underground splice enclosures, increased labor requirements coupled with a decrease in the availability of skilled technicians have resulted in a loss in the reliability of underground systems because of improper initial assembly. On the other hand, less complicated systems more suited to the available skill levels in the industry have been found to be less reliable and/or more expensive. One device by which reliability has been maintained and both cost and complexity of assembly have been reduced is the use of a container filled with the body of sealant into which the exposed conductors can be permanently immersed. Two such devices employing this sealing mechanism are disclosed in U.S. Pat. Nos. 4,039,742 and 4,053,704, assigned to the assignee of the present invention and incorporated herein by reference.

The device disclosed in U.S. Pat. No. 4,039,742 includes a vial of sealant into which the exposed splice is immersed. The cables associated with the splice were first assembled with a cap, a rigid clamping mechanism and an enclosing sleeve. This assembly was then forced into the sealant contained within the vial. It was intended that the sleeve, the rigid clamp and the cap would provide adequate structural protection for the insertion of the splice into the resisting body of sealant. In U.S. Pat. No. 4,053,704, a cap was devised which provided grooves for the incoming cables and was capable of being threaded onto a vial containing the body of sealant. This second device was primarily designed for relatively small splices such as would be encountered in an access telephone line to a residence.

Some difficulties have been encountered even with the total immersion mechanism for protecting cable splices. With larger cables and increased numbers of pairs, the displacement and forces imposed on each pair increase as a consequence of insuring that a larger splice bundle is adequately immersed. As a result, distortion and breakage of pairs can occur during immersion of the splice bundle. Furthermore, with large splices, greater force is required in immersing the splice in the sealant. Air passages through the sealant also become more likely. As a result, the need for skill and care in assembling such splice cases increases with the size of the case.

SUMMARY OF THE INVENTION

The present invention is directed to a splice case which employs the mechanism of totally immersing the exposed splice in a body of sealant. The device is designed for larger sized cables and employs a threaded sleeve which mates with the sealant containing vial to provide mechanical advantage for forcing the splice into the sealant. The rotation of the sleeve into the vial also is believed to cause a relative rotation of the splice relative to the sealant. This action tends to prevent the establishment of passageways through the sealant which might lead to moisture intrusion and the like. However, this relative rotation of the sealant is limited by the fact that the sleeve tends to cause the sealant contained therein to rotate with the splice. Consequently, mild relative rotation between the splice and the sealant is believed to occur.

The sleeve positioned around the splice is associated with a plug that fits into one end of the sleeve. This plug and sleeve assembly is accomplished after the cables and splice have been assembled with the plug. Thus, full access is provided to the splice while providing the protective sleeve during complete assembly. The sleeve also provides a base for further clamping and structurally supporting the cables adjacent the splice when necessary.

The plug is designed for maximum utility with a range of cable sizes. It must be remembered that the mechanism by which a splice is fully immersed in a body of sealant does not require an absolutely moisture proof seal between parts of the case. For this reason, it is unnecessary to provide a complicated sealing mechanism between the plug and the cables. However, the smaller any necessary gaps are, the less likely that the integrity of the seal will be damaged by the environment. Furthermore, a tighter fit for each cable entering the splice case provides better structural control over the cables which in turn insures that the splice is not subjected to twisting, tension or the like. To accommodate the various cable sizes, U-shaped inserts are placed in the U shaped passages extending through the plug. These inserts may be added or subtracted as needed to closely approximate the cable diameter.

To further provide structural support for the splice, a bracket forming a ground shield connector assembly may be fixed to the plug. This assembly rigidly attaches to each of the cables for support and for electrical connection between the ground shields. A resilient cap also capable of accommodating a range of cable diameters is employed to further insure against erosion or other deterioration of the sealant.

Accordingly, it is an object of the present invention to provide an improved cable splice enclosure for a range of cable sizes. Other and further objects and advantages will appear hereinafter.

BRIEF DESCRIPTION OF THE DRAWINGS

FIG. 1 is a plan view of an assembled cable splice enclosure of the present invention.

FIG. 2 is a cross-sectional view of the assembled cable splice enclosure taken along line 2—2 of FIG. 1.

FIG. 3 is an assembled view of the cable splice enclosure taken along line 3—3 of FIG. 2.

FIG. 4 is an assembled view of a cable splice enclosure taken along line 4—4 of FIG. 2.

FIG. 5 is a cross-sectional view as in FIG. 4 with all of the plug inserts removed.

DETAILED DESCRIPTION OF THE PREFERRED EMBODIMENT

Figure 6:
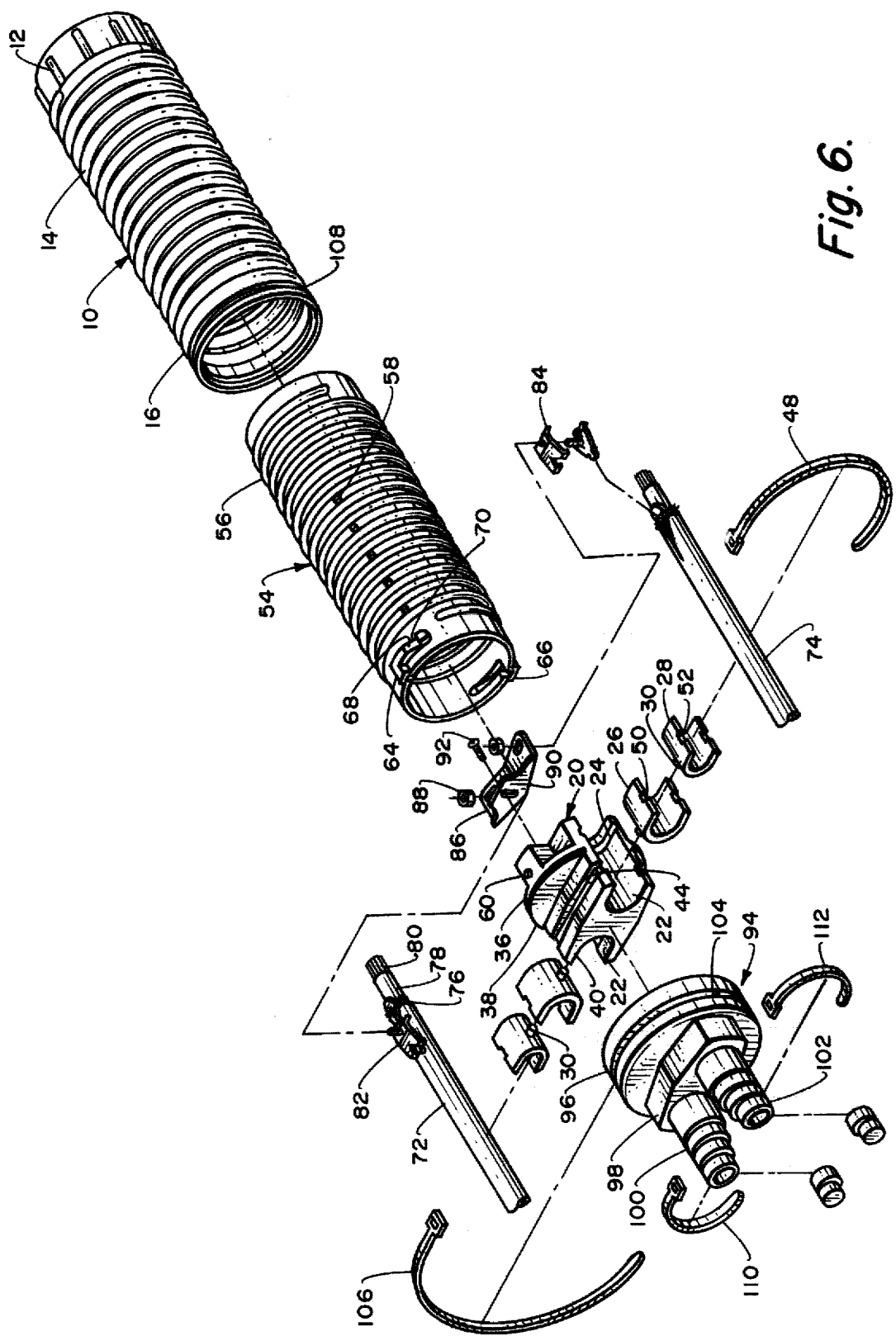
FIG. 6 is an exploded perspective view of the cable splice enclosure of the present invention.

Turning in detail to the drawings, a vial 10 is illustrated in each of the figures as a cylindrical element closed at a first end and fully open at the opposite end. The vial 10 is conveniently made of high density polyethylene and is designed with sufficient size to accommodate a range of cable splices with which the enclosure is intended to be used. At the closed end of the vial 10, ridges 12 parallel to the center line of the vial are provided on the outer surface thereof for increased manual purchase when assembling the case.

Intermediate the ends of the vial 10 threads 14 extend about the periphery thereof. The threads 14 are formed as corrugations in the wall of the vial 10. As a result, the threads are apparent from both the inside and the outside of the vial; however, it is the internal surface of the vial which conforms to the useful thread shape. At the open end of the vial there is a integral cylindrical flange 16 of sufficient inside dimension to accommodate the external threads of an element to be mated with the threads 14 of the vial 10.

The vial 10 is intended to be filled with a sealant 18 such as silicone grease, petroleum jelly or amphorous calcium carbonate. For purposes of sealing splices in the vial, it has been found necessary to fill the vial with sealant only to about three-fourths of the length of the overall vial 10. Naturally, the proximity of the splice to the plug described below will affect the need for additional sealant.

A plug 20 is employed to rigidly receive the spliced cables and substantially fill one end of the enclosure. The plug 20 is illustrated with two passageways 22. Other numbers of passgeways of course may be provided. These passageways 22 are U-shaped in cross-section and extend parallel to the long axis of the case when assembled. Each passageway includes a groove 24 which may receive mastic, sealant or other sealing means for additional sealing control about the cables.

In order to provide for a range of cable diameters, a number of inserts may be employed within the passageways 22. These inserts extend through a portion of the passageways 22 at a distance from the aforementioned groove 24. The inserts are U-shaped to conform to the shape of the passageways 22. A first insert 26 may be positioned in the passageway 22 for the receipt of a first smaller diameter cable than would otherwise be received by the passageway 22. A second insert 28 is similarly constructed and fits within first insert 26 to further reduce the effective diameter of the passageway for receipt of smaller cables. Naturally, it is not ncessary to use the same size inserts in each of the passageways 22. Thus, the cable splice enclosure can accommodate the splicing of different sized cables.

To retain the selected inserts in position within the passageway both for convenience of assembly and for resisting extraction when associated cables may be placed in tension, a location means is provided. The location means includes a mechanism by which an interlocking fit is created within the passageway in a manner such that the location means does not protrude into the defined passageway for the cable whether the inserts are used or not. To this end, locating pins 30 have been placed on the surfaces of the first and second inserts 26 and 28 which mate with the next larger insert or passageway. Holes 32 in the inserts 26 and holes 34 in the passageways 22 receive the pins from the inserts 28 and inserts 26 respectively. Slight interference fits among the inserts 26 and 28 and the passageways 22 also help to retain the inserts in position during assembly.

The body of the plug 20 includes a circular portion 36 with an additional circular flange 38. The circular portion 36 and the circular flange 38 are terminated by the passageways 22 but otherwise provide both a barrier to major intrusion into the case and a shank for alignment of the plug 20 in the sleeve described below. The upper end 40 of the body of the plug 20 is generally rectangular in cross-section with the necessary cutouts for the passageways 22. This rectangular section 40 provides an additional gripping area for the cables and also provides a handle by which an installer can twist the plug relative to the remaining portions of the case. Other cavities and cutouts in the plug such as cavity 42 are provided for ease of fabrication and conservation of material.

Shallow channels 44 and 46 on the upper end 40 of the plug 20 accommodate a locking strap 48. Notches 50 and 52 in the inserts 26 and 28 also accommodate the locking strap 48 such that there is a further interlocking in the assembly and a means by which the cables are held from the outside against the plug.

A sleeve 54 is included in the cable splice enclosure assembly which has corrugations forming threads 56. The outer surface of the sleeve 54 with the external threads 56 is designed to mate with the inside of the vial 10 and the internal threads 14 thereof. This fit is not intended to be a close tolerance fit and sealant is able to remain between these mating surfaces. The threads 56 of the sleeve 54 extend substantially along the length of the sleeve in order that the sleeve may be threaded into the vial 10 along a major portion of its length to draw the assembly through the sealant 18 contained within the vial 10. Holes 58 are distributed along two sides of the sleeve 54 for sealant communication between the interior and exterior of the sleeve. The vial and sleeve are also designed so that the sleeve will meet interference once it is fully seated in the vial. In this way, it becomes more difficult to accidentally back the sleeve out of the vial. The sleeve 54 and necessarily the vial 10 are of appropriate length and cross-sectional dimension to easily accommodate the size range of splices intended to be employed with this device. The splice must be able to sit well down into the body of sealant 18 to insure proper protection.

The sleeve 54 is locked to the plug 20 upon assembly by a locking means which includes a pin and groove arrangement. Two pins 60 and 62 are positioned on the periphery of the plug 20 on the lower portion thereof. Grooves 64 and 66 are formed in the sidewall of the sleeve 54 to accommodate and retain the pins 60 and 62. The grooves 64 and 66 extend axially a short distance from the upper end of the sleeve 54 and then extend in arcs perpendicular to the axis of the sleeve. The bottoms of the grooves include inclined portions 68 and locking shoulders 70 to insure retention of the pins 60 and 62 in the grooves 64 and 66.

Typically on telephone cables there are ground shields made up of wire mesh or foil within the protective coating of the cable and extending about the conductors. Two cables 72 and 74 of such construction are illustrated in the drawings as including a protective outer sheath, a ground shield 76, an innersheath 78 and conductors 80. Naturally, in making a splice, the outer portions of the cables must be stripped back from the conductors 80. It is also advantageous to provide an electrical connection between the ground shield 76 of each of the cables. Ground shield connectors such as disclosed in U.S. Pat. No. 3,619,481, the disclosure of which is incorporated herein by reference may be employed. Ground shield connectors 82 and 84 are associated with the cables 72 and 74 and then fastened to a bracket 86. The ground shield connectors 82 and 84 each have a threaded stud which may be received by holes located in the bracket 86 and fixed by means of nuts 88. The bracket 86 is angled to provide a mounting flange 90 such that the bracket 86 may be mounted to the bottom side of plug by means of a fastener 92. Because the ground shield connectors 82 and 84 securely grip the cables, the overall affect of this ground connection between the two cable shields includes structural support for the cables resisting extraction thereof. As the bracket 86 and ground shield connectors 82 and 84 are of electrically conductive material, the shields 76 are electrically connected.

To further insure against intrusion by the elements into the splice case, a cap 94 is included which may be positioned over all of the aforementioned components to fully close the opened end of the vial 10. Unlike the vial and sleeve which are of high density polyethylene and the plug which is conveniently of foamed ABS, the cap 94 is of a more resilient material. For example, neoprene having a 30 to 40 durometer hardness may be employed. The cap 94 includes a circular main body portion 96 designed to fit over the opened end of the vial 10. A second body portion 98 is sized to fit over the upper end 40 of the plug 20. Lastly, cable sleeves 100 and 102 of stepped diameter extend from the second body portion 98. The stepped diameter of the cable sleeves allows substantial flexibility in the size of cables accommodated. Depending on the size of cable, the stepped diameter cable sleeve may be cut so that the outermost end remaining on the cable sleeve will just fit over the cable extending therethrough. Furthermore, the uncut sleeves 100 and 102 are closed at the outer end such that if for any reason only one cable would be assembled in the closure, the other sleeve would be sealed.

A groove 104 extends about the outer periphery of the main body portion 96 of the cap 94. This groove 104 is designed for a locking strap 106 which may be tightened to draw the body of the cap 94 down onto the upper end of the vial 10. A groove 108 also extends about the upper end of the vial 10 to receive this contracted portion of the cap 94. Similar locking straps 110 and 112 are used about the smallest remaining portions of the stepped diameter cable sleeves to contract the sleeves about the cables.

To assemble this kit of components, the cap 94 is cut to the appropriate cable sleeve diameter and threaded back out of the way onto the cables 92 and 94. Splicing may occur prior to or after assembly of the cables with the plug 20 as desired. The appropriate inserts 26 and 28 are positioned in the passageways 22 as needed and the cables are positioned therein. Mastic or other sealant may be provided in the grooves 24 in the passageways 22 and the locking strap 48 is then tightened about the plug 20 in shallow channels 44 and 46 and about the positioned cables 72 and 74.

Following placement of the cables, the ground shield connectors 82 and 84 are positioned and attached to the bracket 86. The bracket 86 is also attached to the plug by means of the fastener 92. The plug 20 is then inserted along with the splice and cable ends into the sleeve 54 by aligning the pins 60 and 62 with the grooves 64 and 66 and forcing the pins along the grooves to the locking shoulder 70. The flange 38 is larger in diameter than the sleeve 54 and is faced from the pins 60 and 62 such that when the plug 20 is assembled with the sleeve 54 the flange 38 rests on the end of the sleeve 54 to provide further closure of the device.

Following assembly of the plug and sleeve, the vial 10 is threaded onto the sleeve 54 such that the sleeve and the enclosed splice and cable ends are forced into the body of sealant 18. Care must be taken to assure that the splice is spaced sufficiently from the plug that it will be totally immersed in the sealant upon assembly. As noted above, the rotary action of the vial as it is being threaded over the sleeve 54 causes the sealant 18 to rotate to some extent relative to the splice. However, as also noted above, the sleeve tends to retard this rotation of the sealant 18 with the vial 10 such that an appropriate compromise is reached between excessive rotation which might damage the splice and insufficient rotation which would allow a greater possibility of open channels trailing from the inserted splice.

Lastly, the cap 94 is drawn down the cables 72 and 74 into position over the end of the vial 10. Locking straps 106, 110 and 112 are then tightened. The resulting assembly may then be buried without further attention.

Accordingly, a easily assembled, inexpensive, reliable and very convenient splice case is disclosed above. While embodiments and applications of this invention has been shown and described, it would be apparent to those skilled in the art that many more modifications are possible without departing from the inventive concepts herein. The invention, therefore, is not to be restricted except by the spirit of the appended claims.

What is claimed is:

1. A cable splice enclosure for cable splices, comprising
    a vial having a first, open end and internal threads;
    a body of sealant contained within said vial;
    a sleeve having external threads substantially along its length and two open ends, said external threads on said sleeve being corrugations in the wall of said sleeve and being sized and adapted to mate with said internal threads on said vial, said sleeve being adapted to be positioned in said vial with a first said open end of said sleeve deep in said vial;
    a plug sized and adapted to substantially close a second said open end of said sleeve, said plug having passageways therethrough for receipt of cables; and
    a locking means associated with the second said open end of said sleeve and said plug for fixing said plug in said sleeve.

2. A cable splice enclosure of claim 1 wherein said internal threads of said vial are corrugations in the wall of said vial and extend substantially the length thereof.

3. A cable splice enclosure for cable splices, compromising
    a vial having a first, open end and internal threads;
    a body of sealant contained within said vial;
    a sleeve having external threads substantially along its length and two open ends, said external threads being sized and adapted to mate with said internal threads of said vial, said sleeve being adapted to be positioned in said vial with a first said open end of said sleeve deep in said vial;

a plug sized and adapted to substantially close a second said open end of said sleeve, said plug having passageways therethrough for receipt of cables; and a locking means associated with the second said open end of said sleeve and said plug for fixing said plug in said sleeve, said locking means including pins on one of said plug or said sleeve and grooves located on the other of said plug or said sleeve, said grooves extending in arcs about the center line of said enclosure and having a portion of each said arc including a locking flange for permanent retention of said pins.

4. A cable splice enclosure for cable splices, comprising a vial having a first, open end and internal threads;

a body of sealant contained within said vial;

a sleeve having external threads substantially along its length and two open ends, said external threads being sized and adapted to mate with said internal threads of said vial, said sleeve being adapted to be positioned in said vial with a first said open end of said sleeve deep in said vial;

a plug sized and adapted to substantially close a second said open end of said sleeve, said plug having passageways therethrough for receipt of cables, said passageways on said plug being U-shaped in cross-section and said plug further including U-shaped inserts, said passageways and said inserts including location means for fixing said inserts in said passageways; and a locking means associated with the second said open end of said sleeve and said plug for fixing said plug in said sleeve.

5. The cable splice enclosure of claim 4 wherein said location means includes pins on the surfaces of said inserts most adjacent said passageways and holes to receive said pins on the interior of said passageways.

6. A cable splice enclosure for cable splices, comprising a vial having a first, open end and internal threads;

a body of sealant contained within said vial;

a sleeve having external threads substantially along its length and two open ends, said external threads being sized and adapted to mate with said internal threads of said vial, said sleeve being adapted to be positioned in said vial with a first said open end of said sleeve deep in said vial;

a plug sized and adapted to substantially close a second said open end of said sleeve, said plug having passageways therethrough for receipt of cables;

a locking means associated with the second said open end of said sleeve and said plug for fixing said plug in said sleeve; and a bracket, a fastener for attaching said bracket to the interior end of said plug and ground shield connectors capable of being fastened to said bracket.

* * * * *